Dec. 15, 1970          B. S. CROSS          3,546,709
HAT FOR HOLDING ARTICLES
Filed July 3, 1968
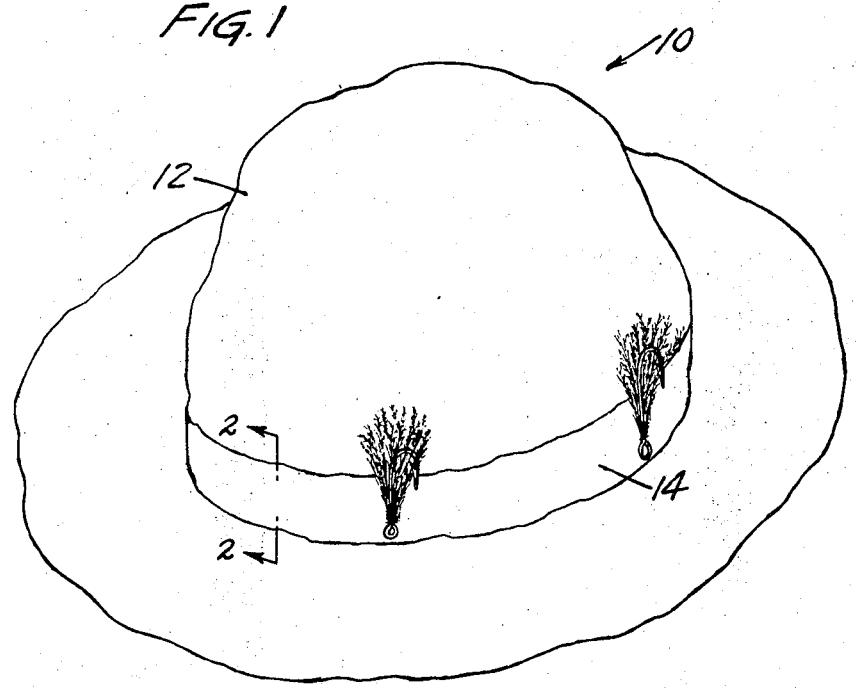
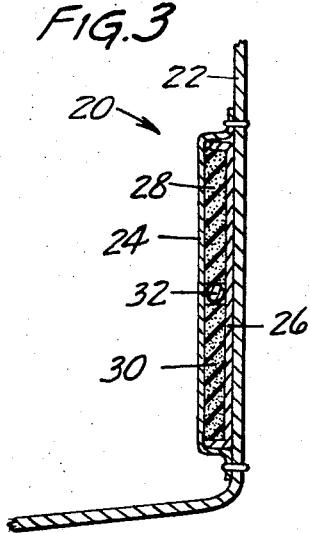
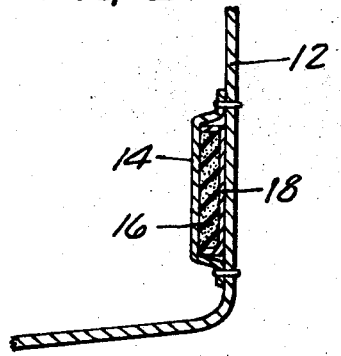
INVENTOR.
BERT S. CROSS
BY Kinney, Alexander,
Sell, Steldt & DeLaHunt
ATTORNEYS

United States Patent Office 3,546,709
Patented Dec. 15, 1970

3,546,709
HAT FOR HOLDING ARTICLES
Bert S. Cross, Dellwood, Minn., assignor to Minnesota Mining and Manufacturing Company, St. Paul, Minn., a corporation of Delaware
Filed July 3, 1968, Ser. No. 742,301
Int. Cl. A01k 97/00; A42b 1/24; A42c 5/00
U.S. Cl. 2—179
2 Claims

ABSTRACT OF THE DISCLOSURE

A hat having a hatband and flexible magnetic material within said hatband for attaching articles such as fishing flies to said hatband.

---

This invention relates to an improved hat for attaching articles such as fishing flies to the hatband thereof.

Fly fishermen and many workers often use the hatband of a hat to hold articles such as fishing flies, nails and pencils. These articles are usually attached to the hatband by puncturing it or by forcing the article through the stitching which holds the hatband to the hat. Either of these methods cause damage to the hatband, destroying the appearance and utility of the hat, and making removal of the articles from the hatband difficult. A further problem with fishing flies and other delicate fishing lures is the necessity to tightly grasp the lure between the thumb and forefinger in order to get a sufficient hold on the lure to puncture the hatband with the hook of the lure and to remove the lure from the hatband; either operation may be destructive of the fly.

It is therefore an object of the present invention to provide a hat with a hatband to which magnetically attractable articles may be attached without destroying the appearance or further utility of the hat.

The present invention preserves the advantages desired for holding magnetically attractable articles such as fishing lures on a hatband while eliminating many of the disadvantages associated with the practice by providing a hat having a hatband with a strip of flexible magnetic material confined within the space between the hat and the hatband and conforming to the normal curvature of the hat whereby attachment to the hatband of the article to be attached may be accomplished simply by touching the article to the hatband. Removal of the article from the hatband is likewise simplified since the article may be simply plucked from the band without any disengagement from the stitching around the material forming the hatband.

The novel features and advantages of the present invention will become apparent after reading the following description which refers to the accompanying drawing wherein:

FIG. 1 is a perspective view of a hat for holding articles made in accordance with the present invention;

FIG. 2 is a cross-sectional view along the place of section line 2—2 of FIG. 1 showing a configuration with one strip of flexible magnetic material; and FIG. 3 is a cross-sectional view similar to that of FIG. 2 but showing a configuration with two strips of flexible magnetic material.

The hat for holding articles, generally designated 10, of the present invention comprises a hat body 12, a hatband 14, and a strip of a flexible magnetic material 16.

The hat body 12 need have no particular shape and the present invention contemplates the use of any of the group of wearing apparel commonly designated as hats. The hat body 12 of FIG. 1 is shown with a full brim and crown because this is the type of hat most commonly having a hatband 14.

The hatband 14 is preferably made of a thin piece of cloth, as a majority of hats presently in use, to reduce cost, but any thin material will work equally as well. The hatband 14 is made of thin material since the material of the hatband 14 is between the article to be held and the flexible magnetic material 16 and the strength of the magnetic field decreases with increased distance from the flexible magnetic material 16. The band is secured to the hat body 12 generally along the top and bottom edges thereof to leave space between itself and the hat body 12. Within the space formed between the hatband 14 and hat body one or more strips of flexible magnetic material is provided and may extend around the entire hat body 14 or only a portion thereof.

The strips of flexible magnetic material 16 are contemplated as being oriented magnetic particles in a plastic matrix of the type described as oriented magnetically anisotropic particles in a workable matrix material in U.S. Pat. 2,999,275. The matrix may be of plastic or rubber. One or more of these strips 16 is placed between the hatband 14 and the hat body 12. This type of strip may be made sufficiently flexible so that it may be shaped to conform to the curvature of the hat body 12 and may be retained in that shape in the space between the hatband 14 and the hat body 12 by the hatband being secured to the hat body in the manner presently used Depending on the use of the hat the strips 16 may extend only a portion of the circumference of the hatband 14 or may be coextensive with circumference of the hatband 14.

To decrease the spread of the magnetic flux lines about the flexible magnetic material and thereby increase the attraction near the hatband 14 a channel shaped strip of magnetically conductive metal 18 is added. The flexible strip of magnetic material 16 is fit in the channel of the strip of metal 18 and the combination is placed in the space between the hatband 14 and the hat body 12 with the exposed surface of the strip of magnetic material 16 adjacent the hatband 14 as seen in FIG. 2. This metal strip 18 may be formed to conform to the curvature of the hat body 12 or it may be sufficiently flexible to conform to the curvature of the hat body by the hatband 14. In the case where the metal strip extends completely around the hat body 12 it may be fastened to itself where its ends meet.

If a wide area is desired on which to attach articles the variation shown in FIG. 3 may be used. In such case a wider hatband 24 and channel shaped strip of metal 26 are employed and two flexible magnetic strips 28 and 30 are fit in the channel of the strip of metal 26. A magnetically conductive metal strip 32 is placed between the two strips of flexible magnetic material 28 and 30 to decrease the spread of the magnetic flux lines around each strip of flexible magnetic material and thereby to increase the attraction adjacent each of them. This strip of magnetically conductive metal 32 may be a portion of the channel shaped strip of metal 26 thereby defining two channels or it may be a wire as shown or other metal strip placed between the strips of flexible magnetic material 28 and 30.

In use, when the hat is worn, magnetically attractive articles need only be touched against the hatband 14 and the attractive force between the article and the flexible magnetic strip 16 behind the hatband 14 will attach the article to the hatband 14 without fear that the article will fall and be lost.

Having thus described the present invention with reference to a preferred embodiment, it will be understood that minor modifications may be made therein without departing from the spirit and scope of the invention.

What is claimed is:
1. A hat having a hatband, means within said hatband for attaching articles such as fishing flies to said hatband by magnetic attraction, said means comprising a channel shaped strip of a magnetically conductive metal and a strip of flexible magnetic material fit in the channel of said strip of metal, said strip of metal and said flexible magnetic material being confined within the space between said hatband and said hat and conforming to the normal curvature of said hat with the exposed face of said flexible magnetic material adjacent said hatband, whereby the magnetic field adjacent said hatband is strengthened for firmer attachment of articles to said hatband.

2. The hat of claim 1 including a second strip of flexible magnetic material in the channel of said strip of metal with one edge adjacent an edge of said first strip of flexible magnetic material and a separator strip of a magnetically conductive metal between said strips of flexible magnetic material, whereby the width of the area for attaching articles may be increased without decreasing the attractive force.

References Cited

UNITED STATES PATENTS

| | | |
|---|---|---|
| 459,942 | 9/1891 | Brown. |
| 2,597,601 | 5/1952 | Sherman _____ 2—179 |
| 2,999,275 | 9/1961 | Blume _____ 156—243 |

JORDAN FRANKLIN, Primary Examiner

G. H. KRIZMANICH, Assistant Examiner

U.S. Cl. X.R.

43—57.5